United States Patent
Kim et al.

(10) Patent No.: US 9,175,651 B2
(45) Date of Patent: Nov. 3, 2015

(54) DUAL FUEL SYSTEM FOR INTERNAL COMBUSTION ENGINE AND LEAKAGE LIMITING SEAL STRATEGY FOR SAME

(71) Applicant: Caterpillar, Inc., Peoria, IL (US)

(72) Inventors: Hoisan Kim, Dunlap, IL (US); Cory Andrew Brown, Peoria, IL (US); Glenn B. Cox, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 253 days.

(21) Appl. No.: 13/987,653

(22) Filed: Aug. 19, 2013

(65) Prior Publication Data

US 2015/0047614 A1 Feb. 19, 2015

(51) Int. Cl.
| | |
|---|---|
| *F02M 63/00* | (2006.01) |
| *F02M 61/10* | (2006.01) |
| *F02M 43/04* | (2006.01) |
| *F02D 19/06* | (2006.01) |
| *F02D 19/08* | (2006.01) |
| *F02M 21/02* | (2006.01) |

(52) U.S. Cl.
CPC ............ *F02M 43/04* (2013.01); *F02D 19/0647* (2013.01); *F02D 19/0694* (2013.01); *F02D 19/081* (2013.01); *F02M 21/0281* (2013.01)

(58) Field of Classification Search
CPC ... F02M 63/00; F02M 63/0061; F02M 61/10; F02M 61/12; F02M 63/0012
USPC .......... 239/533.1, 533.2, 533.3, 533.4, 533.5, 239/533.9, 533.11, 584, 585.5
See application file for complete search history.

(56) References Cited

U.S. PATENT DOCUMENTS

| | | | | |
|---|---|---|---|---|
| 3,764,076 | A * | 10/1973 | Eblen ......................... | 239/533.6 |
| 4,356,976 | A * | 11/1982 | Eblen et al. ................. | 239/533.5 |
| 4,499,862 | A * | 2/1985 | Baumer et al. ................. | 123/1 A |
| 4,700,672 | A * | 10/1987 | Baguena ....................... | 123/299 |
| 5,996,558 | A | 12/1999 | Ouellette et al. | |
| 6,073,862 | A | 6/2000 | Touchette et al. | |
| 6,298,833 | B1 | 10/2001 | Douville et al. | |
| 6,336,598 | B1 | 1/2002 | Touchette et al. | |
| 8,596,561 | B2 * | 12/2013 | Kim et al. ................. | 239/585.5 |
| 2012/0325350 | A1 | 12/2012 | Kim et al. | |
| 2013/0048750 | A1 | 2/2013 | Kim et al. | |
| 2013/0098333 | A1 | 4/2013 | Kim et al. | |
| 2013/0319373 | A1 * | 12/2013 | Brown et al. ................. | 123/456 |

OTHER PUBLICATIONS

Brown et al., Dual Fuel Injector and Fuel System, U.S. Appl. No. 13/905,285, filed May 30, 2013, 26 pages, United States.

* cited by examiner

*Primary Examiner* — Justin Jonaitis

(57) ABSTRACT

A dual fuel system includes liquid and gaseous fuel supplies and a fuel injector in fluid communication therewith. A gaseous fuel check in the fuel injector forms a leak path with a fuel injector body between gaseous and liquid fuel passages, and a leakage limiting seal is positioned about the gaseous fuel check and deformable into sealing contact with the gaseous fuel check responsive to an increase in a pressure drop from the liquid fuel passage to the gaseous fuel passage in the fuel injector.

19 Claims, 7 Drawing Sheets

DUAL FUEL SYSTEM FOR INTERNAL COMBUSTION ENGINE AND LEAKAGE LIMITING SEAL STRATEGY FOR SAME

TECHNICAL FIELD

The present disclosure relates generally to dual fuel systems, and more particularly to limiting leakage through a leak path in a fuel injector for a dual fuel system.

BACKGROUND

Gaseous fuel engines are known for their ability to burn clean relative to liquid fuel compression ignition engine counterparts. Gaseous fuels, however, are also well known for difficulty in attaining successful ignition. Some gaseous fuel engines utilize a spark plug, whereas other gaseous fuel engines utilize a small amount of a pilot fuel such as distillate diesel fuel, compression ignited to initiate combustion of a larger main charge of gaseous fuel such as natural gas. In these latter engines, the gaseous fuel may be supplied to the engine intake manifold, or metered directly into individual cylinders, where is it mixed with air prior to being ignited responsive to the pilot diesel injection.

In many dual fuel engine systems, injection of the liquid fuel and gaseous fuel is controlled by two separate needle checks within a fuel injector connected to both gaseous fuel and liquid fuel common rails. Designs are known where concentric needle checks are used, with one of an inner check and an outer check used to open and close a gaseous fuel outlet, and the other of the inner and outer check used to open and close a liquid fuel outlet. In other systems, adjacent rather than coaxial needle checks are used. One known adjacent needle check design employs hydraulic control pressure from a liquid fuel common rail applied to a top end of each of the needle checks opposite the working tip which controls opening and closing of the corresponding nozzle outlet. Liquid rail pressure is also applied to an opening hydraulic surface of the check controlling liquid fuel injection. In the case of the check controlling gaseous fuel injection, a pressure of the gaseous fuel common rail is applied to a primary opening hydraulic surface of the check. In still another known system, U.S. Pat. No. 7,627,416 appears to teach a dual fuel common rail design in which liquid diesel fuel and natural gas fuel are both injected from a single fuel injector associated with each engine cylinder. This reference recognizes there may be instances in which the engine will need to operate solely on liquid diesel fuel due to exhaustion of the natural gas fuel supply or possibly some fault in the natural gas portion of the system. Certain problems and challenges associated with liquid fuel only operation are neither recognized nor addressed, however.

SUMMARY

In one aspect, a dual fuel system for an internal combustion engine includes a liquid fuel supply, a gaseous fuel supply, and a fuel injector. The fuel injector includes an injector body defining a liquid fuel passage in fluid communication with the liquid fuel supply, a gaseous fuel passage in fluid communication with the gaseous fuel supply, and a gaseous fuel nozzle outlet. The fuel injector further includes a gaseous fuel check guided within the injector body between retracted and advances positions at which fluid communication is open and blocked, respectively, between the gaseous fuel passage and the gaseous fuel nozzle outlet. The injector body and the gaseous fuel check together form a leak path for controlled leakage of liquid fuel from the liquid fuel passage to the gaseous fuel passage responsive to a pressure drop therebetween. The fuel injector further includes a leakage limiting seal having an outer surface exposed to a fluid pressure of the liquid fuel passage, an inner surface exposed to a fluid pressure of the leak path, and being positioned about the gaseous fuel check such that the leakage limiting seal deforms into sealing contact with the gaseous fuel check responsive to an increase in the pressure drop.

In another aspect, a fuel injector for a dual fuel system in an internal combustion engine includes an injector body defining a liquid fuel passage extending between a liquid fuel inlet and a liquid fuel outlet, and a gaseous fuel passage extending between a gaseous fuel inlet and a gaseous fuel nozzle outlet. The fuel injector further includes a gaseous fuel check guided within the injector body between retracted and advanced positions at which fluid communication is open and blocked, respectively, between the gaseous fuel passage and the gaseous fuel nozzle outlet, for controlling injection of gaseous fuel from the gaseous fuel nozzle outlet into a cylinder in the internal combustion engine. The injector body and the gaseous fuel check together form a leak path from the liquid fuel passage to the gaseous fuel passage. The fuel injector further includes a leakage limiting seal having an outer surface exposed to a fluid pressure of the liquid fuel passage, and an inner surface exposed to a fluid pressure of the leak path. The leakage limiting seal is in a first state where the inner surface has a clearance with the gaseous fuel check and permits controlled leakage of the liquid fuel through the leak path. The leakage limiting seal is deformable to a second state at which the inner surface is in sealing contact with the gaseous fuel outlet check to limit the leakage, responsive to an increase in a pressure drop from the liquid fuel passage to the gaseous fuel passage.

In still another aspect, a method of limiting migration of liquid fuel to a gaseous fuel side of a dual fuel system in an internal combustion engine includes increasing a pressure drop from a liquid fuel passage to a gaseous fuel passage in fluid communication with one another via a leak path formed by a gaseous fuel check and an injector body in a fuel injector of the dual fuel system. The method further includes deforming a leakage limiting seal into sealing contact with the gaseous fuel check, responsive to the increase in the pressure drop, and reducing leakage of liquid fuel through the leak path via the sealing contact.

DETAILED DESCRIPTION

Figure 1:
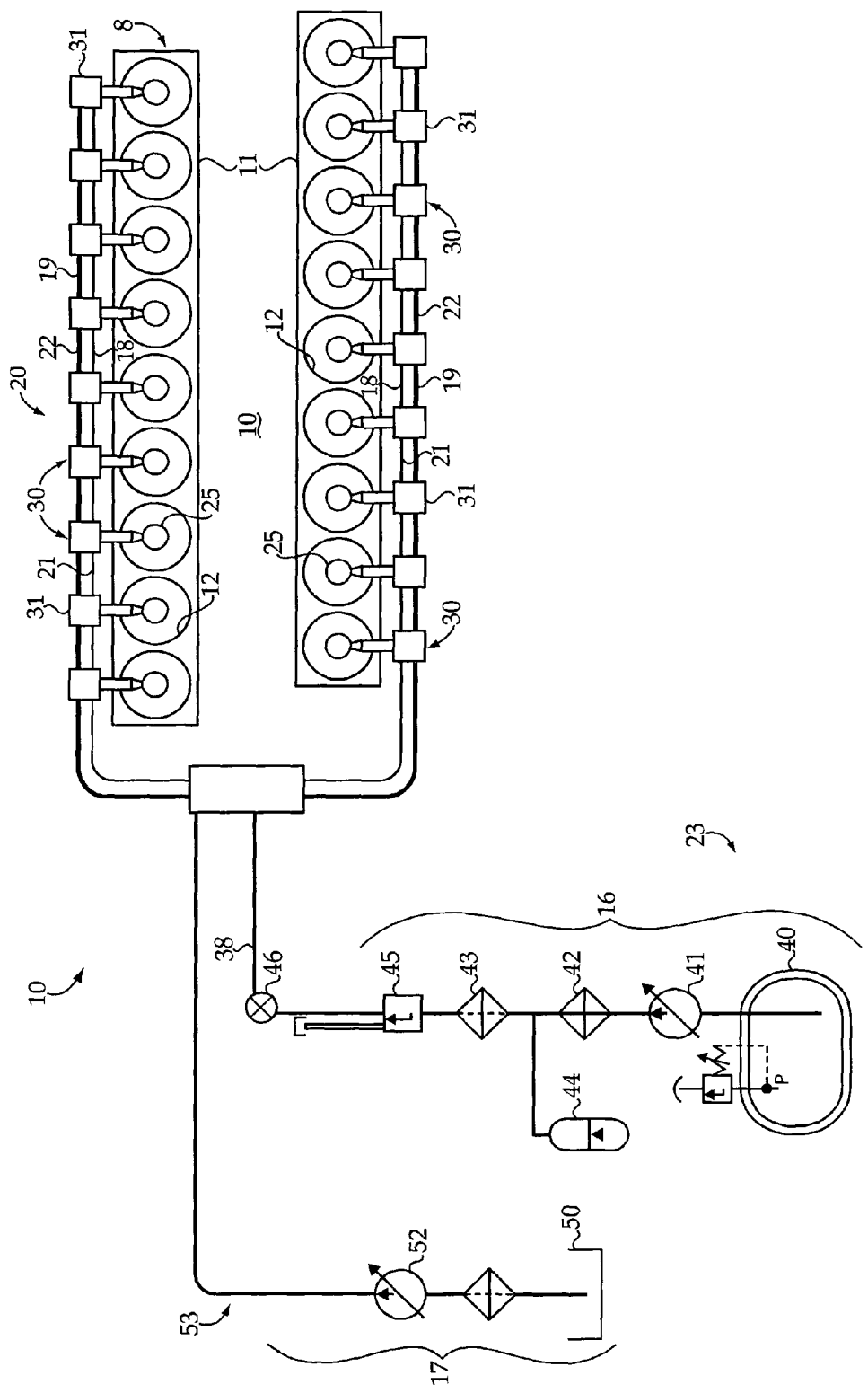
FIG. 1 is a schematic view of a dual fuel engine system according to the present disclosure.
Figure 2:
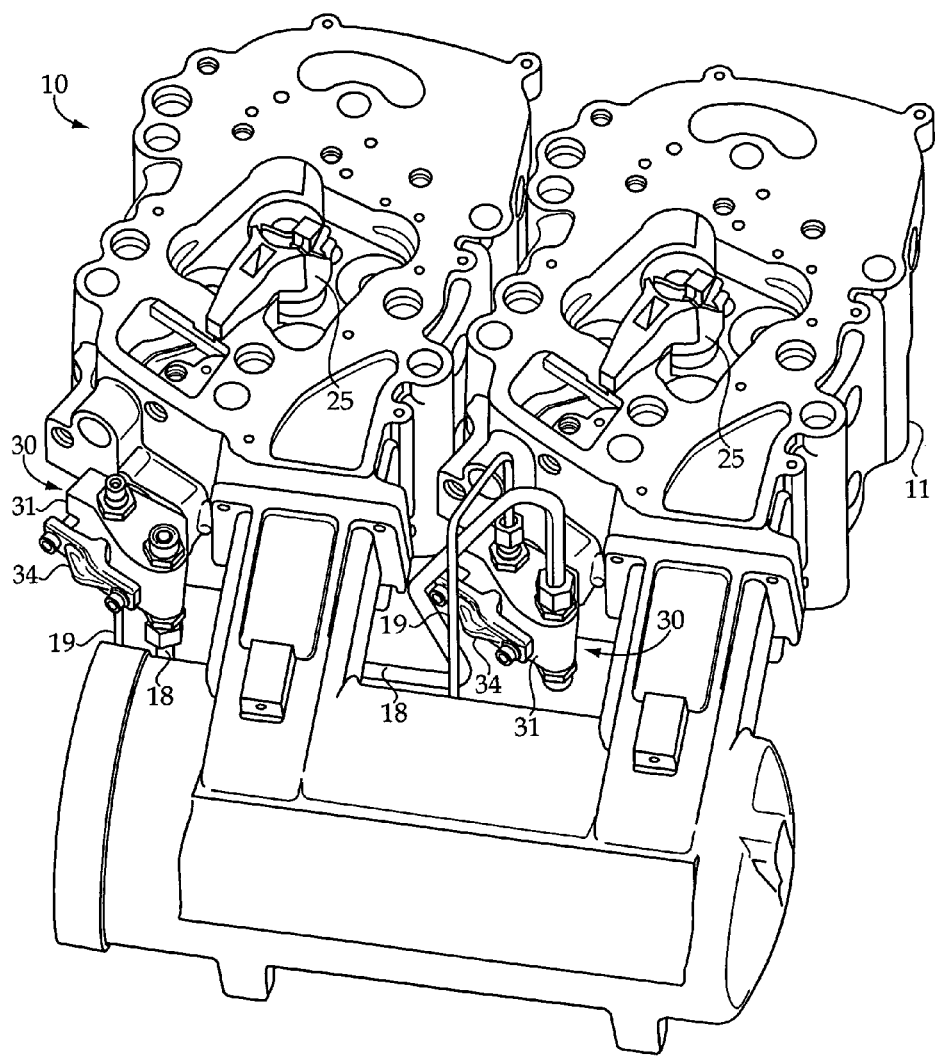
FIG. 2 is a perspective view of a portion of a dual fuel system similar to that depicted in FIG. 1.
Figure 3:
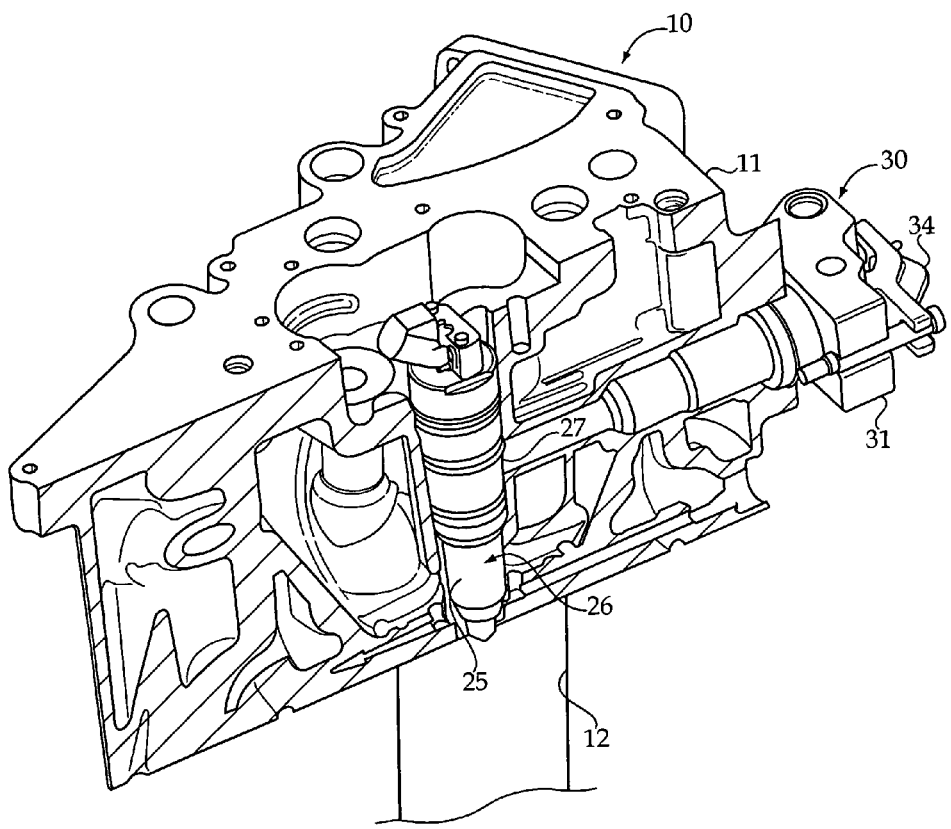
FIG. 3 is a partially sectioned view, in perspective, of a portion of the engine system shown in FIG. 2 to reveal structure for one fuel injector and one engine cylinder.

Referring initially to FIGS. 1-3, a dual fuel engine system 10 includes a dual fuel system 20 mounted to an engine housing 11 of an engine 8 that defines a plurality of engine cylinders 12. The dual fuel system 20 may include exactly one fuel injector 25 positioned for direct injection into each one of the plurality of engine cylinders 12. A gaseous fuel common rail 21 and a liquid fuel common rail 22 are fluidly connected to each fuel injector 25, and are parts of a gaseous fuel subsystem 23 and a liquid fuel subsystem 53 of dual fuel system 20, respectively. The liquid fuel may include liquid diesel distillate, whereas the gaseous fuel may include natural gas, each for compression ignition in engine 8. The dual fuel system 20 also includes gaseous fuel supply and pressure control mechanisms 16 as well as liquid fuel supply and pressure control mechanisms 17, respectively fluidly connected to common rail 21 and common rail 22. A gaseous fuel conduit 38 fluidly connects mechanisms 16 to common rail 21 by way of a shutoff valve 46. Each of fuel injectors 25, mechanisms 16, and mechanisms 17 may be in control communication with, and controlled by, an electronic engine control unit (not shown) in a known manner. Mechanisms 16 may include a pressurized cryogenic liquefied natural gas supply or tank 40 with an outlet fluidly connected to a variable delivery cryogenic pump 41. Mechanisms 16 may also include a heat exchanger 42, an accumulator 44, a fuel conditioning module 45 that controls the supply and pressure of gaseous fuel to gaseous fuel common rail 21, and one or more gaseous fuel filters, pressure sensors, and possibly still other diagnostic, control, and monitoring components. A pressure relief valve (not shown) might be positioned in conduit 38.

Mechanisms 16 may supply gaseous fuel to common rail 21 at a medium fuel pressure relative to a supply pressure of liquid fuel. Mechanisms 17 may include a diesel fuel supply or tank 50, a fuel filter and an electronically controlled high pressure fuel pump 52 that supply liquid fuel to, and control pressure in, liquid fuel common rail 22. Mechanisms 17 may supply liquid fuel to common rail 22 at a range of higher fuel pressures relative the medium supply pressure of gaseous fuel. Each of gaseous fuel pressure and liquid fuel pressure may be adjustable for reasons which will be understood by those skilled in the art, but in general liquid fuel pressures will be higher than gaseous fuel pressures at least within common rails 21 and 22 in practical implementation strategies.

Figure 4:
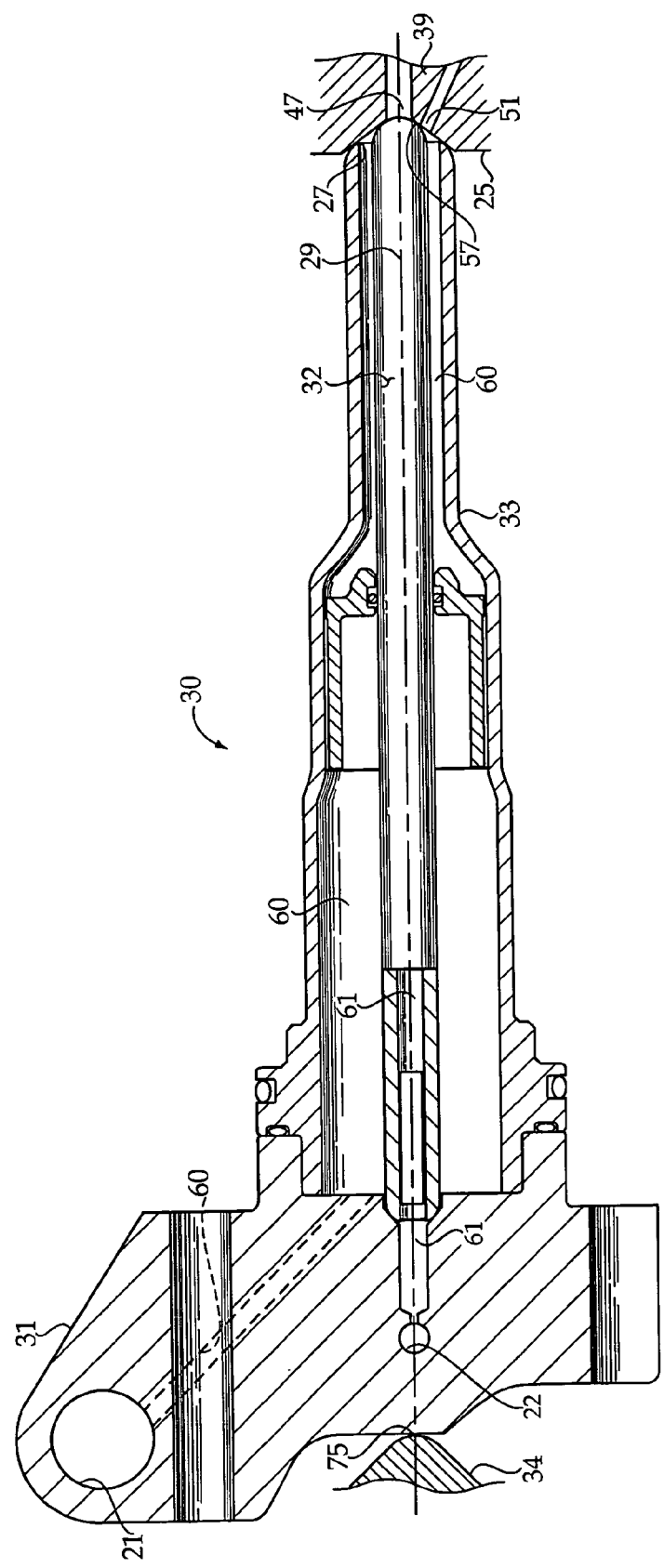
FIG. 4 is a partially sectioned side view through a co-axial quill connector assembly according to another aspect of the present disclosure.

Referring in addition to FIG. 4, dual fuel system 20 may include a coaxial quill connector 30 with an inner quill 32 defining an inner fuel passage 61 and an outer quill 33 defining an outer fuel passage 60, and having a tip in sealing contact with a common conical seat 27 of one of fuel injectors 25. Each of a plurality of similar or identical quill connectors 30 may be coupled one with each of fuel injectors 25. Blocks 31 of the coaxial quill connectors 30 may be daisy-chained together with gaseous fuel line segments 18 and liquid fuel line segments 19 to form gaseous fuel common rail 21 and liquid fuel common rail 22, respectively. The last coaxial quill connector 30 in the daisy-chain may have a set of plugs in place of fittings shown in FIG. 2. A coaxial quill connector 30 is thus fluidly positioned between each of the plurality of fuel injectors 25 and each of gaseous fuel common rail 21 and liquid fuel common rail 22. Each coaxial quill connector 30 may further include a load adjusting clamp 34 with a pivot surface 75 in contact with one of blocks 31 at a load adjustment location that is intersected by an axis 29 of inner quill 32.

Each block 31 of each co-axial quill connector 30 may define a segment of gaseous fuel common rail 21 that is oriented perpendicular to axis 29 of inner quill 32. Passage 60 opens at one end into gaseous fuel common rail 21 and opens at its other end into a gaseous fuel inlet 51 defined by an injector body 39 of fuel injector 25. Passage 61 opens at one end into liquid fuel common rail 22, and opens at its opposite end into a liquid fuel inlet 47 defined by fuel injector body 39. Quill connector 30 forms a metal-to-metal seal 57 with injector body 39. Seal 57 separates passages 60 and 61, and also inlets 47 and 51, which are respectively connected to gaseous and liquid fuel passages within injector 25 as further described herein. Passages 60 and 61 will thus be understood to fluidly connect the liquid and gaseous fuel passages in fuel injector 25 with common rails 22 and 21, respectively, and common rails 22 and 21 understood to fluidly connect those liquid and gaseous fuel passages with supply 50 and supply 40, respectively.

Figure 5:
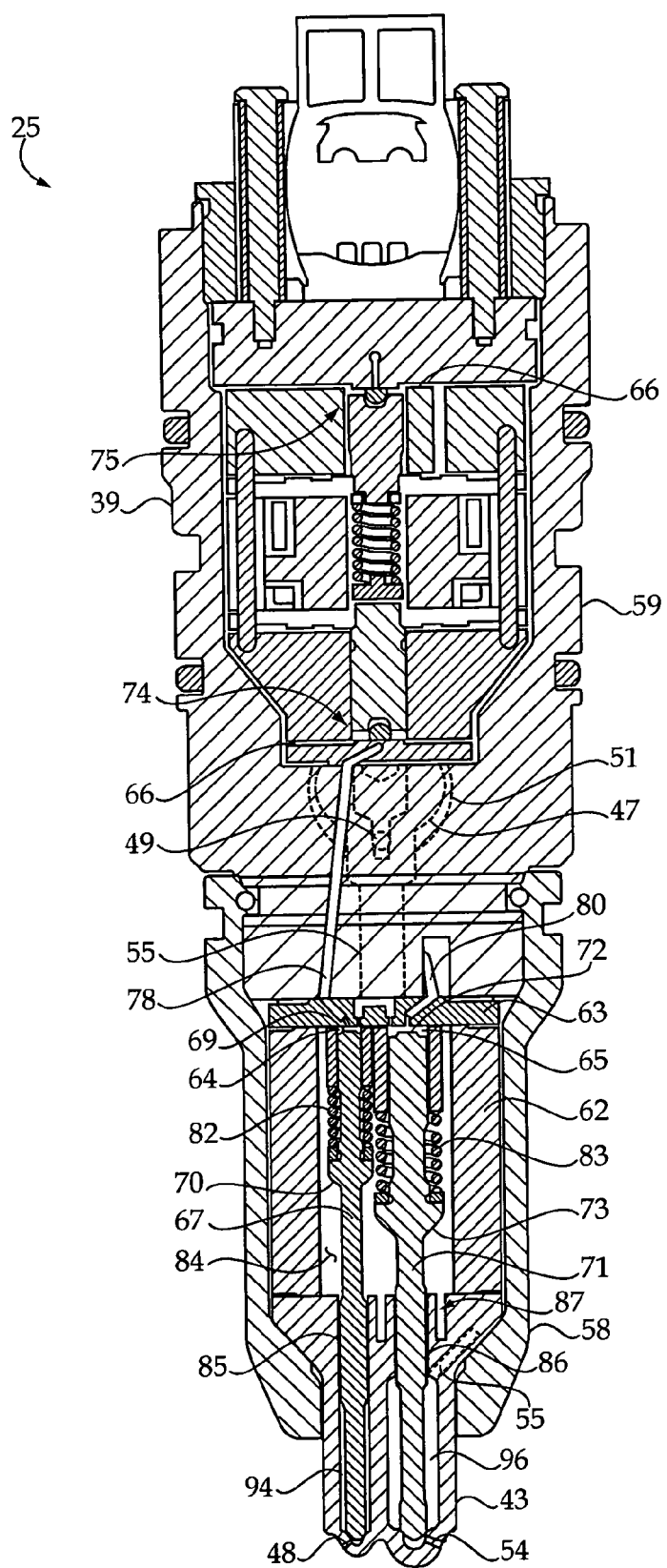
FIG. 5 is a sectioned diagrammatic view of a fuel injector, according to one embodiment.

Referring also now to FIG. 5, injector body 39 may further include a nozzle tip piece 43 extending into cylinder 12. Injector body 39 may also define a liquid fuel nozzle outlet 48, and a liquid fuel supply passage 49 extending between liquid fuel inlet 47 and liquid fuel nozzle outlet 48. Injector body 39 may further define a gaseous fuel nozzle outlet 54, and a gaseous fuel supply passage 55 extending between inlet 51 and gaseous fuel nozzle outlet 54. The liquid fuel pressure may be higher than the gaseous fuel pressure in most instances, as noted above. Each of nozzle outlets 48 and 54 may include a plurality of spray orifices formed in tip piece 43, and nozzle outlets 48 and 54 may be vertically offset from one another as shown. A variety of internal components of fuel injector 25, which may be electronically controlled, are used to control the opening and closing of outlets 48 and 54 in a manner further described herein.

Injector body 39 may include a plurality of body pieces, of which tip piece 43 is one. Tip piece 43 may be positioned within an outer body piece 58, attached to an upper body piece or clamping body piece 59. Upper body piece 59 may be threadedly coupled with body piece 58, and rotated to clamp together internal components of injector 25. Dowels or any other suitable strategy may be used to align internal components of injector 25 during assembly to obtain the desired fluid connections further discussed herein. Injector body 39 may also include an inner body piece 62 and an orifice plate 63, clamped between body piece 59 and tip piece 43. Injector body 39 further defines a first check control chamber 64 and a second check control chamber 65, each in fluid communication with liquid fuel inlet 47, and a low pressure space 66. Low pressure space 66 may be comprised of any combination or configuration of outlets, spaces, clearances between components, or leak paths, so long as a pressure gradient from check control chambers 64 and 65 to low pressure space 66 can be established to enable fuel injection control. Injector 25 may also include a liquid fuel needle check 67 guided within injector body 39 between retracted and advanced positions at which fluid communication is open and blocked, respectively, between passage 49 and liquid fuel nozzle outlet 48. Check 67 has a closing hydraulic surface 69 exposed to a fluid pressure of first check control chamber 64, and further has an opening hydraulic surface 70 exposed to the fuel pressure of passage 49. In the FIG. 2 illustration, passage 49 is partially hidden from view, however, it will be understood by those skilled in the art that the passage extends through the components positioned between inlet 47 and outlet 48 to supply liquid fuel for injection. A chamber 84 forms a segment of passage 49. A nozzle chamber 94 connects chamber 84 and outlet 48. Injector 25 further includes a gaseous fuel needle check 71 positioned side-by-side, and typically parallel with needle check 67, and guided within injector body 39 between retracted and advanced positions at which fluid communication is open and blocked, respectively, between passage 55 and outlet 54, for controlling injection of gaseous fuel from outlet 54 into the corresponding cylinder 12 in engine 8. Needle check 71 has a closing hydraulic surface 72 exposed to a fluid pressure of check control chamber 65 and an opening hydraulic surface exposed to the fuel pressure of liquid fuel supply passage 49, within chamber 84. Needle check 71 may also have opening gas pressure surfaces exposed to a gas pressure of gaseous fuel supply passage 55 in a nozzle chamber 96, but will typically be urged open based at least in part on hydraulic pressure.

Injector 25 further includes a liquid fuel injection control valve 74 and a gaseous fuel injection control valve 75, positioned fluidly between first and second check control chambers 64 and 65, respectively, and low pressure space 66. In the illustrated embodiment, each of control valves 74 and 75 is part of an electrically actuated control valve assembly, having at least one valve member, an armature, and a solenoid. A first drain passage 78 fluidly connects check control chamber 64 with control valve 74, which is actuated to reduce a pressure in check control chamber 64 such that a closing hydraulic force acting on closing hydraulic surface 69 is reduced, enabling the fuel pressure of liquid fuel supply passage 49, via opening hydraulic surface 70, to lift check 67 and open outlet 48. Another drain passage 80 fluidly connects check control chamber 65 to control valve 75 to enable opening of needle check 71 to inject gaseous fuel via outlet 54. In contrast to certain known dual fuel strategies, hydraulic pressure, as opposed to gas pressure, acts on an opening hydraulic surface of both the liquid fuel and gaseous fuel needle checks, although the present disclosure is not thusly limited To end injection, control valves 74 and 75 may be deactivated, either energized or de-energized as the case may be, to restore the fluid pressure in chambers 64 or 65 to liquid rail pressure. Control valves 74 and 75 might be of any suitable configuration and could each include a 2-way valve as shown, a 3-way valve, or still another strategy. In a practical implementation strategy, injector 25 further includes a first spring 82 biasing needle check 67 closed, sealing outlet 48, and a second spring 83 biasing needle check 71 closed to seal outlet 54. Opening of needle checks 67 or 71 may occur in opposition to a bias of the corresponding spring. Closing of needle checks 67 and 71 may occur in opposition to fluid pressures opposing the closing pressure provided in control chambers 64 and 65. In the case of check 71, gas pressure may be acting on the tip, in opposition to the closing pressure in control chamber 65. Check 67 and check 71 are received within first and second guide bores 85 and 86 defined by tip piece 43.

It will be recalled that opening hydraulic surfaces 70 and 73 may be exposed to the fuel pressure of liquid fuel supply passage 49, typically equal to fuel pressure in common rail 22. In the embodiment shown, checks 67 and 71 are each positioned partially within chamber 84, which forms a segment of liquid fuel supply passage 49. Chamber 84 may have first and second springs 82 and 83 positioned therein, and thus may be understood as a spring chamber. Opening hydraulic surfaces 70 and 73 may thus be exposed to the fuel pressure within the same spring chamber 84. In alternative embodiments, multiple spring chambers or some other strategy for supplying liquid rail pressure to the opening hydraulic surfaces might be used.

Figure 6:
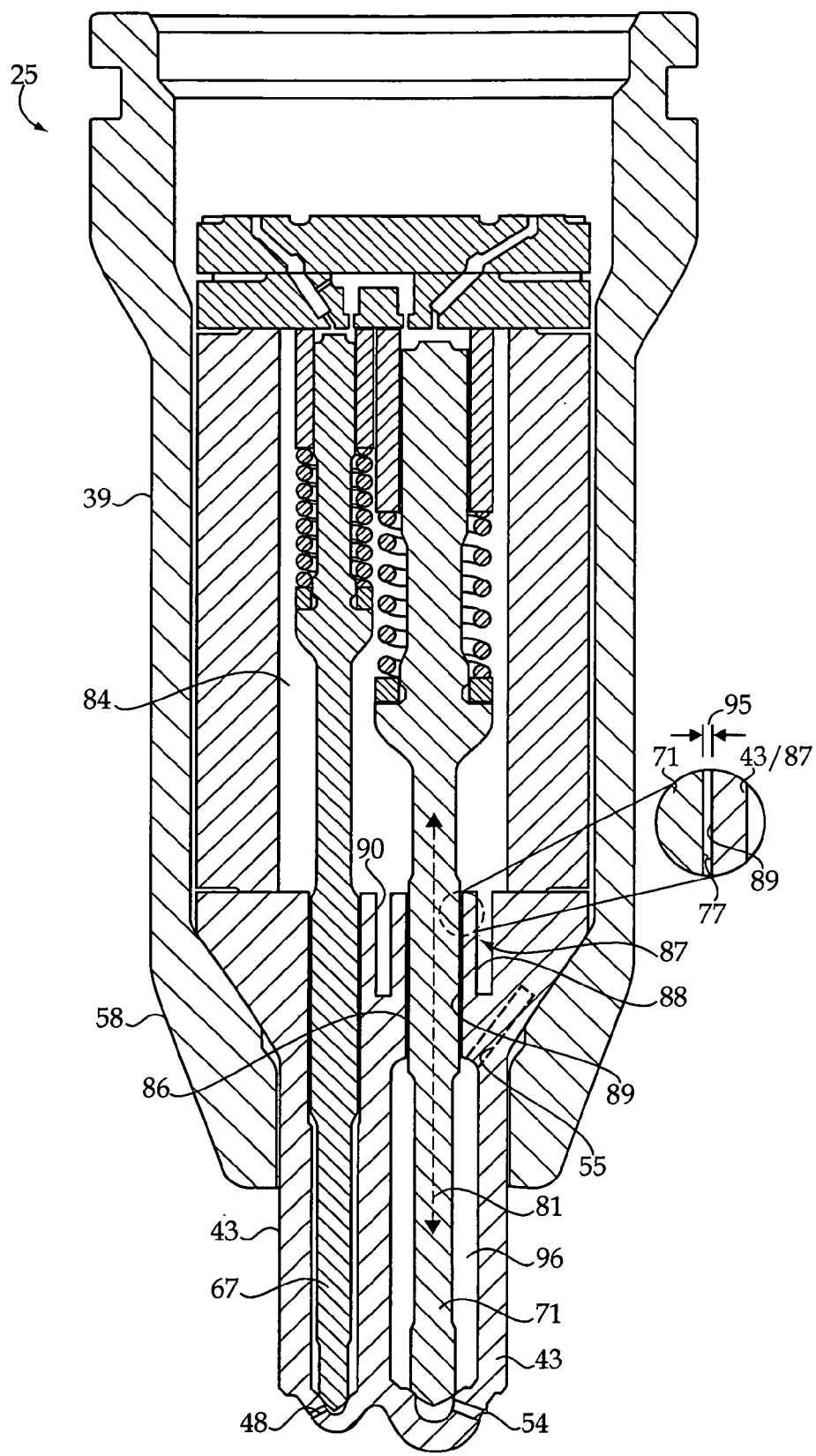
FIG. 6 is a sectioned diagrammatic view of a portion of the fuel injector of FIG. 5.

Referring now also to FIG. 6, it will be recalled that liquid fuel may be supplied from liquid fuel common rail 22 to liquid fuel passage 49 at a high pressure, and gaseous fuel may be supplied from gaseous fuel common rail 21 to gaseous fuel passage 55 at a medium pressure. In a liquid only mode a difference between the medium and high pressures may be about 50 MPa to about 80 MPa, whereas in a mixed mode the difference may be about 5 MPa. Injector body 39 and gaseous fuel check 71 together form a leak path 77 for controlled leakage of liquid fuel from liquid fuel passage 49 to gaseous fuel passage 55. Such controlled leakage may be a design feature that enables relatively small quantities of liquid fuel to migrate through leak path 77 to lubricate surfaces of gaseous fuel check 71 contacting surfaces of injector body 39. Most of the time, this small amount of migrated liquid fuel will be expelled through outlet 54 during gaseous fuel injection. At certain times it may be desirable to operate engine system 10 in liquid fuel only mode, such as where some fault occurs in gaseous fuel subsystem 23, during start-up or diagnostic operation, or where engine system 10 runs out of gaseous fuel, for instance. It may then be desirable to reduce and ideally eliminate migration of liquid fuel through leak path 77, to avoid liquid fuel accumulating in or damaging gaseous fuel subsystem 23. To this end, fuel injector 25 may further include a leakage limiting seal 87 having an outer surface 88 exposed to a fluid pressure of liquid fuel passage 49, and an inner surface 89 exposed to a fluid pressure of leak path 77. Seal 87 is positioned about gaseous fuel check 71 such that seal 87 deforms into sealing contact with gaseous fuel check 71 responsive to an increase in the pressure drop. During liquid only operation, pressure in gaseous fuel subsystem 23, and in particular fluid pressure in common rail 21 will be reduced, and may drop to atmospheric pressure. At the same time, a pressure of liquid fuel in liquid fuel subsystem 53 may be maintained, or increased to accommodate a demand for injection of liquid fuel or demand for an increased amount of liquid fuel injection. Absent a mechanism for managing the effects of the increase in pressure drop, a leakage rate through leak path 77 could be expected to substantially increase. Thus, in some instances the teachings of the present disclosure could be applied to limit an increase in leakage, although in practical implementation strategies the leakage will typically be substantially eliminated. In the case of a start-up condition, liquid fuel pressure will of course tend to be raised whereas gaseous fuel pressure will tend to remain for a time at whatever pressure was resident in gaseous fuel subsystem 23 when engine 10 was turned off, typically atmospheric pressure. In the FIG. 6 illustration, seal 87 is in a first state as shown in the detailed enlargement where inner surface 89 has a clearance 95 with gaseous fuel check 71 and permits the controlled leakage of liquid fuel through leak path 77. Seal 87 is deformable to a second state at which inner surface 89 is in sealing contact with check 71 to limit the leakage. The sealing contact may include metal-to-metal contact, as each of check 71 and seal 87 may be formed from metal such as a suitable steel. It should be appreciated that the sealing contact may not occur uniformly, and may not form a perfect liquid seal, but will in any event tend to reduce and/or close clearance 95 such that an area of leak path 77 becomes zero or close to zero at least at some point along the interface between seal 87 and check 71.

It may be noted from FIG. 6 that outer surface 88 extends circumferentially around check 71 at a radially outward location. Inner surface 89 likewise extends circumferentially around check 71 but at a radially inward location, such that the deformation of seal 87 occurs in a radially inward direction. Seal 87 defines a longitudinal axis 81, and surfaces 88 and 89 may be parallel, concentric and centered on axis 81. In the FIG. 6 embodiment, seal 87 has the form of a generally cylindrical sleeve, and is formed integrally with tip piece 43. Accordingly, an annular fluid space 90 extends between seal 87 and the rest of tip piece 43, with space 90 being open to fluid communication with liquid fuel passage 49 via chamber 84. In a practical implementation strategy, clearance 95 may include a matched clearance. Guide bore 86 may have a uniform inner diameter from nozzle chamber 96 to chamber 84, with seal 87 being that portion of tip piece 43 that is surrounded by space 90. Guide bore 86 might instead have a tighter matched clearance with check 71 in that part of tip piece 43 forming seal 87, and a somewhat looser guide clearance elsewhere. In many instances, it can be expected that material of tip piece 43 forming seal 87 could deform non-uniformly, with portions of seal 87 relatively close to chamber 84 being more readily deformable than portions closer to nozzle chamber 96. Accordingly, seal 87 could be expected to squeeze or pinch down about check 71 to form the fluid seal just adjacent to chamber 84 at the top end of tip piece 43. Surfaces 88 and 89 might be non-parallel in alternative embodiments.

Figure 7:
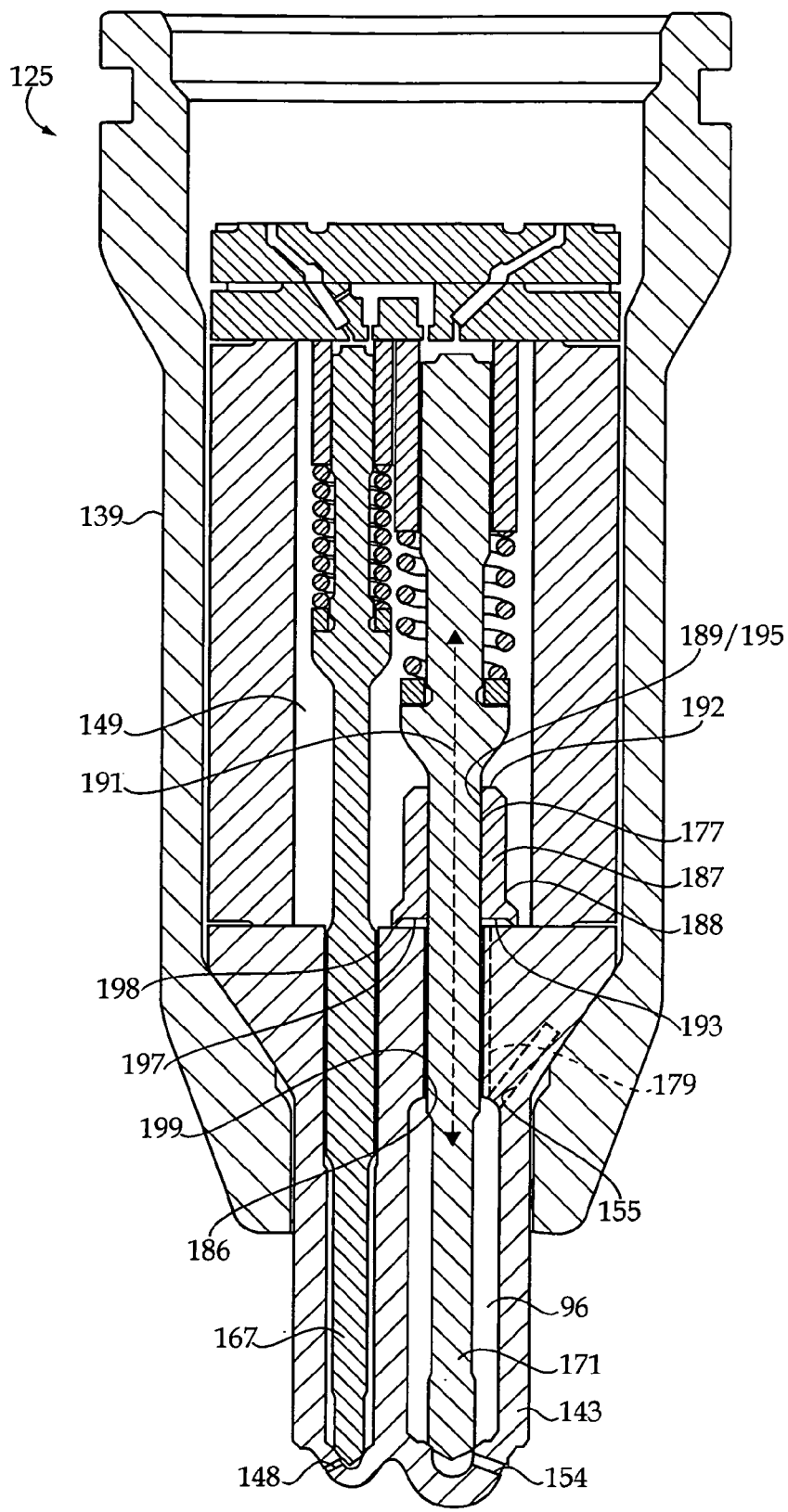
FIG. 7 is a sectioned diagrammatic view of a portion of a fuel injector, according to another embodiment.

Turning now to FIG. 7, there is shown a fuel injector 125 according to another embodiment, including an injector body 139 having a liquid fuel check 167 and a gaseous fuel check 171 each guided within a tip piece 143 between retracted and advanced positions at which fluid communication is open and blocked, respectively, between a liquid fuel passage 149 and a liquid fuel nozzle outlet 148 and between a gaseous fuel passage 155 and a gaseous fuel nozzle outlet 154. Fuel injector 125 is configured and functions generally analogously to that of fuel injector 25 discussed above, except where otherwise indicated. Analogous to fuel injector 25, fuel injector 125 includes a leakage limiting seal 187 defining a longitudinal axis 191 extending between a first axial end 192 and a second axial end 193 of seal 187. Seal 187 further includes an outer surface 188 extending circumferentially around gaseous fuel check 171 at a radially outward location, and an inner surface 189 extending circumferentially around gaseous fuel check 171 at a radially inward location. Gaseous fuel check 171 and injector body 139, in particular tip piece 143, together form a leak path 177 for controlled leakage of liquid fuel from liquid fuel passage 149 to gaseous fuel passage 155. Seal 187 is deformable from a first state where inner surface 189 has a clearance 195 with check 171 and permits the controlled leakage of liquid fuel through leak path 177 to a second state where clearance 195 is reduced and surface 189 is in sealing contact with check 171, responsive to an increase in a pressure drop from liquid fuel passage 149 to gaseous fuel passage 155.

In contrast to the design of fuel injector 25, whose leakage limiting seal is formed integrally with a tip piece, in fuel injector 125 seal 187 includes a floating seal abutting tip piece 143, in contact with tip piece 143 at an axial end of tip piece 143 that faces and in part defines a chamber forming a segment of fuel passage 149. Seal 187 is floating in the sense that its position relative tip piece 143 is not fixed. In one practical implementation strategy, clearance 195 may include a lesser clearance, and check 171 may have a greater clearance 199 with injector body 143, namely tip piece 143, within a bore 186 formed therein. Clearance 195 may include a matched clearance, and clearance 199 may include a guide clearance.

Tip piece 143 may further define a communication passage 179 communicating a pressure of gaseous fuel passage 155 to a low pressure area 197 formed in part by seal 187 and in part by tip piece 143. Alternatively, a similar communication passage might be formed in check 171. Thus, while FIG. 7 illustrates passage 179 extending along and in communication with clearance 199, those skilled in the art will readily appreciate a groove or the like in check 171 could provide similar functionality. Low pressure area 197 will enable inner surface 189 to be exposed to a fluid pressure of leak path 177, which will typically be linked to fluid pressure of gaseous fuel passage 155 though not necessarily equal. Second axial end 193 may further include an annular knife edge extending circumferentially around axis 191, and sealing against tip piece 143 in response to hydraulic force applied to seal 187.

INDUSTRIAL APPLICABILITY

Referring to the drawings generally, but in particular to FIGS. 6 and 7, it will be recalled that in certain instances a pressure drop from liquid fuel passages 49 and 149 to gaseous fuel passages 55 and 155 may be increased, such as during start-up operation of engine system 10, operation for diagnostic purposes, or any other condition where liquid fuel-only mode is desired. In response to the increased pressure drop, leakage limiting seals 87 and 187 may be deformed into sealing contact with gaseous fuel checks 71 and 171. As a result of the deformation, leakage of liquid fuel through leak paths 77 and 177 may be reduced, potentially to zero.

During liquid fuel-only mode, gaseous fuel checks 71 and 171 will typically remain in their advanced positions blocking the corresponding gaseous fuel outlets 54 and 154. In the case of injector 25, seal 87 will tend to remain in an inwardly deformed state, squeezed about check 71 and limiting migration of liquid fuel to the gaseous fuel side of dual fuel system 20, namely subsystem 23. In the case of fuel injector 125, seal 187 will tend to remain during liquid-only mode in an inwardly deformed state, also squeezed about check 171, and being held in a biased down position via the fluid pressure of passage 149, such that knife edge 198 seals against tip piece 143. Communication groove 179 will connect pressure area 197 to a pressure of gaseous fuel passage 155.

When it is desirable to return to a gaseous fuel mode or a mixed liquid and gaseous fuel mode, the pressure drop from liquid fuel passages 49 and 149 to gaseous fuel passages 55 and 155 will typically be decreased, either because of a decrease in the liquid fuel pressure, an increase in the gaseous fuel pressure, or both. Decreasing the pressure drop will tend to reduce the extent to which seals 87 and 187 are inwardly deformed, and controlled leakage of liquid fuel through leak paths 77 and 177 will resume.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:
1. A dual fuel system for an internal combustion engine comprising:
    a liquid fuel supply;
    a gaseous fuel supply;
    a fuel injector including an injector body defining a liquid fuel passage in fluid communication with the liquid fuel supply, a gaseous fuel passage in fluid communication with the gaseous fuel supply, and a gaseous fuel nozzle outlet;
    the fuel injector further including a gaseous fuel check guided within the injector body between retracted and advanced positions at which fluid communication is open and blocked, respectively, between the gaseous fuel passage and the gaseous fuel nozzle outlet, and the injector body and the gaseous fuel check together forming a leak path for controlled leakage of liquid fuel from the liquid fuel passage to the gaseous fuel passage responsive to a pressure drop therebetween; and the fuel injector further including a leakage limiting seal having an outer surface exposed to a fluid pressure of the liquid fuel passage, an inner surface exposed to a fluid pressure of the leak path, and being positioned about the gaseous fuel check such that the leakage limiting seal deforms into sealing contact with the gaseous fuel check responsive to an increase in the pressure drop.

2. The dual fuel system of claim 1 further comprising a gaseous fuel common rail fluidly connecting the gaseous fuel supply to the gaseous fuel passage, and a liquid fuel common rail fluidly connecting the liquid fuel supply with the liquid fuel passage, and wherein the injector body defines a liquid fuel nozzle outlet and a liquid fuel check guided within the injector body between retracted and advanced positions at which fluid communication is open and blocked, respectively, between the liquid fuel passage and the liquid fuel nozzle outlet.

3. The dual fuel system of claim 2 wherein each of the gaseous fuel check and the liquid fuel check includes an opening hydraulic surface exposed to a fluid pressure of the liquid fuel passage.

4. The dual fuel system of claim 3 wherein the outer surface of the leakage limiting seal extends circumferentially around the gaseous fuel check at a radially outward location, and the inner surface extends circumferentially around the gaseous fuel check at a radially inward location, such that the leakage limiting seal is configured to deform in a radially inward direction.

5. The dual fuel system of claim 4 wherein the injector body further includes a tip piece defining a first and a second guide bore receiving the gaseous fuel check and the liquid fuel check, respectively, and having each of the liquid fuel nozzle outlet and the gaseous fuel nozzle outlet formed therein.

6. The dual fuel system of claim 5 wherein the leakage limiting seal includes a floating seal abutting the tip piece.

7. The dual fuel system of claim 6 wherein the leakage limiting seal includes a first axial end, and a second axial end abutting the tip piece and having an annular knife edge.

8. The dual fuel system of claim 5 wherein the leakage limiting seal is resident within the tip piece.

9. The dual fuel system of claim 8 wherein the leakage limiting seal includes a sleeve formed integrally with the tip piece.

10. A fuel injector for a dual fuel system in an internal combustion engine comprising:
an injector body defining a liquid fuel passage extending between a liquid fuel inlet and a liquid fuel outlet, and a gaseous fuel passage extending between a gaseous fuel inlet and a gaseous fuel nozzle outlet;
a gaseous fuel check guided within the injector body between retracted and advanced positions at which fluid communication is open and blocked, respectively, between the gaseous fuel passage and the gaseous fuel nozzle outlet, for controlling injection of gaseous fuel from the gaseous fuel nozzle outlet into a cylinder in the internal combustion engine, and the injector body and the gaseous fuel check together forming a leak path from the liquid fuel passage to the gaseous fuel passage;
a leakage limiting seal having an outer surface exposed to a fluid pressure of the liquid fuel passage, and an inner surface exposed to a fluid pressure of the leak path; and
the leakage limiting seal being in a first state where the inner surface has a clearance with the gaseous fuel check and permits controlled leakage of the liquid fuel through the leak path, and being deformable to a second state at which the inner surface is in sealing contact with the gaseous fuel check to limit the leakage, responsive to an increase in a pressure drop from the liquid fuel passage to the gaseous fuel passage.

11. The fuel injector of claim 10 wherein the outer surface of the leakage limiting seal extends circumferentially around the gaseous fuel check at a radially outward location, and the inner surface extends circumferentially around the gaseous fuel check at a radially inward location, such that in the second state the leakage limiting seal is deformed in a radially inward direction.

12. The fuel injector of claim 11 wherein the sealing contact includes metal-to-metal contact.

13. The fuel injector of claim 11 wherein the injector body further defines a guide bore receiving the gaseous fuel check, and wherein the clearance includes a lesser clearance and the gaseous fuel check has a greater clearance with the injector body within the guide bore.

14. The fuel injector of claim 10 wherein the liquid fuel outlet includes a liquid fuel nozzle outlet, and further comprising a liquid fuel check guided within the injector body between retracted and advanced positions at which fluid communication is open and blocked, respectively, between the liquid fuel passage and the liquid fuel nozzle outlet.

15. The fuel injector of claim 14 wherein the injector body further includes a tip piece defining a first and a second guide bore receiving the gaseous fuel check and the liquid fuel check, respectively, and having each of the liquid fuel nozzle outlet and the gaseous fuel nozzle outlet formed therein.

16. The fuel injector of claim 15 wherein the leakage limiting seal includes a floating seal abutting the tip piece.

17. The fuel injector of claim 15 wherein the leakage limiting seal is formed integrally with the tip piece.

18. A method of limiting migration of liquid fuel to a gaseous fuel side of a dual fuel system in an internal combustion engine comprising the steps of:
increasing a pressure drop from a liquid fuel passage to a gaseous fuel passage in fluid communication with one another via a leak path formed by a gaseous fuel check and an injector body in a fuel injector of the dual fuel system;
deforming a leakage limiting seal into sealing contact with the gaseous fuel check, responsive to the increase in the pressure drop; and
reducing leakage of liquid fuel through the leak path via the sealing contact.

19. The method of claim 18 wherein the step of deforming further includes deforming the leakage limiting seal such that a clearance between an inner surface of the leakage limiting seal exposed to a fluid pressure of the leak path and the gaseous fuel check is reduced.

* * * * *